United States Patent
Kim

(10) Patent No.: US 12,463,241 B2
(45) Date of Patent: Nov. 4, 2025

(54) SECONDARY BATTERY

(71) Applicant: LG ENERGY SOLUTION, LTD., Seoul (KR)

(72) Inventor: Il-Hong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 830 days.

(21) Appl. No.: 17/774,246

(22) PCT Filed: Nov. 12, 2020

(86) PCT No.: PCT/KR2020/015928
§ 371 (c)(1),
(2) Date: May 4, 2022

(87) PCT Pub. No.: WO2021/096267
PCT Pub. Date: May 20, 2021

(65) Prior Publication Data
US 2022/0393229 A1  Dec. 8, 2022

(30) Foreign Application Priority Data
Nov. 12, 2019 (KR) .................. 10-2019-0144585

(51) Int. Cl.
*H01M 10/0525* (2010.01)
*H01M 4/36* (2006.01)
(Continued)

(52) U.S. Cl.
CPC ....... *H01M 10/0525* (2013.01); *H01M 4/364* (2013.01); *H01M 4/386* (2013.01); *H01M 4/587* (2013.01); *H01M 10/44* (2013.01)

(58) Field of Classification Search
CPC ... H01M 10/0525; H01M 4/364; H01M 4/386
See application file for complete search history.

(56) References Cited

U.S. PATENT DOCUMENTS 9,815,383 B2 * 11/2017 Komiyama ........... H02J 7/0063
10,020,497 B2   7/2018 Kang et al.
(Continued)

FOREIGN PATENT DOCUMENTS

JP   2006-185716 A   7/2006
JP   2016-167368 A   9/2016
(Continued)

OTHER PUBLICATIONS

Machine Translation (Year: 2018).*
(Continued)

*Primary Examiner* — Richard V Muralidar
(74) *Attorney, Agent, or Firm* — Birch, Stewart, Kolasch & Birch, LLP

(57) ABSTRACT

A secondary battery including a positive electrode, a negative electrode and a separator interposed between the negative electrode and the positive electrode. The negative electrode includes: a negative electrode current collector; and a negative electrode active material layer on at least one surface of the negative electrode current collector. The negative electrode active material layer includes a mixed active material comprising a carbonaceous active material and a Si-based active material. The secondary battery is controlled by setting a lower limit of state-of-charge (SOC) during operation of the secondary battery depending on a weight mixing ratio of the Si-based active material to the carbonaceous active material. The capacity ratio of the Si-based active material to the carbonaceous active material.

12 Claims, 1 Drawing Sheet

(51) Int. Cl.
  *H01M 4/38*    (2006.01)
  *H01M 4/587*   (2010.01)
  *H01M 10/44*   (2006.01)

(56) References Cited

U.S. PATENT DOCUMENTS

| | | | |
|---|---|---|---|
| 10,408,886 | B2 | 9/2019 | Joe et al. |
| 10,605,870 | B2 | 3/2020 | Kim et al. |
| 10,826,112 | B2 | 11/2020 | Matsushita et al. |
| 2006/0275668 | A1 | 12/2006 | Peres et al. |
| 2012/0070745 | A1 | 3/2012 | Ishida et al. |
| 2016/0264017 | A1 | 9/2016 | Komiyama |

FOREIGN PATENT DOCUMENTS

| | | | |
|---|---|---|---|
| JP | 6038275 | B2 | 12/2016 |
| JP | 2018-85316 | A | 5/2018 |
| JP | 2018085316 | * | 5/2018 |
| JP | 2019-50094 | A | 3/2019 |
| JP | 2019-91565 | A | 6/2019 |
| KR | 10-1223626 | B1 | 1/2013 |
| KR | 10-1985812 | B1 | 6/2013 |
| KR | 10-2014-0036535 | A | 3/2014 |
| KR | 10-1487495 | B1 | 1/2015 |
| WO | WO 2017/081918 | A1 | 6/2017 |
| WO | WO 2018/038957 | A1 | 3/2018 |

OTHER PUBLICATIONS

Extended European Search Report for European Application No. 20886359.7, dated Nov. 4, 2022.
International Search Report (PCT/ISA/210) issued in PCT/KR2020/015928 mailed on Feb. 25, 2021.

\* cited by examiner

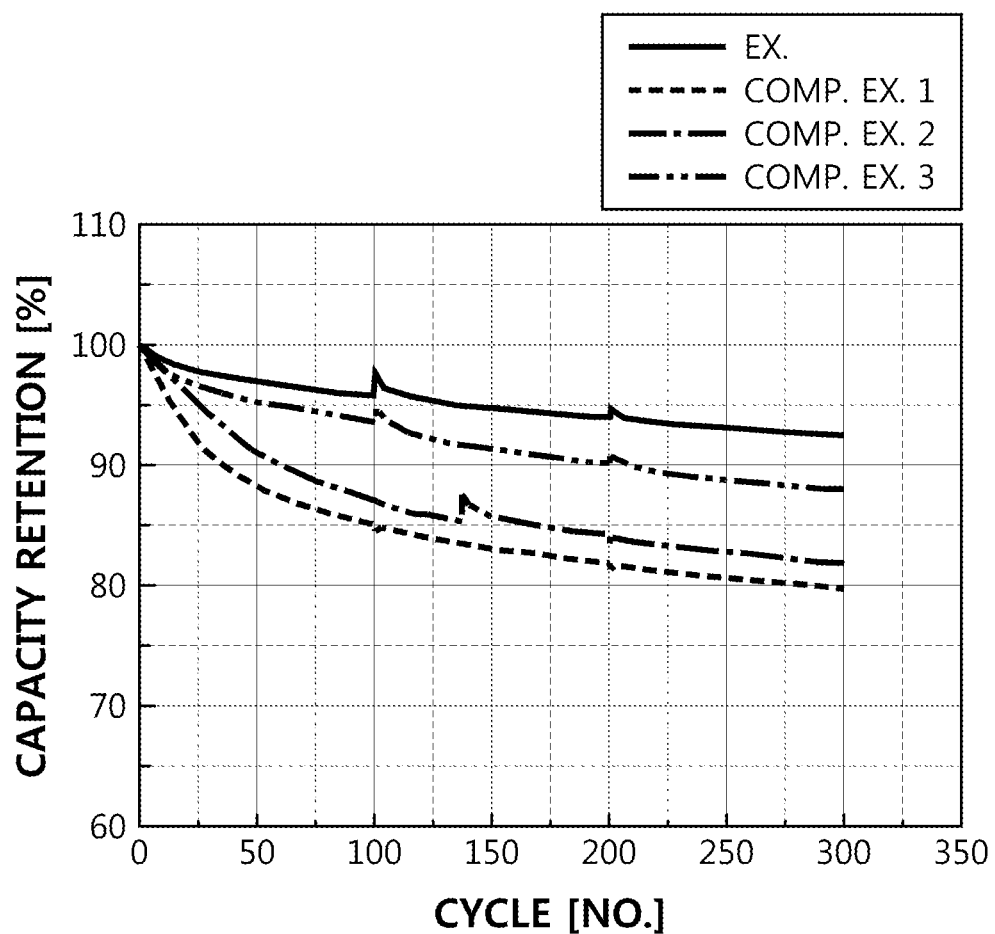

SECONDARY BATTERY

TECHNICAL FIELD

The present disclosure relates to a secondary battery, and particularly, to a secondary battery having improved energy density, The present application claims priority to Korean Patent Application No. 10-2019-0144585 filed on Nov. 12, 2019 in the Republic of Korea, the disclosures of which are incorporated herein by reference.

BACKGROUND ART

Recently, the market of electric vehicles, robots and electric power storage devices have been developed rapidly, and thus there has been a need for secondary batteries having high energy density, high stability, compactness, light weight and long service life. Whether secondary batteries can be applied to such large-scale industrial fields or not depends on securement of the performance of secondary batteries, including higher energy density per weight or per volume as compared to the energy density according to the related art.

Graphite, which is a commercially available negative electrode active material for a lithium ion battery, has a limited theoretical capacity of 372 mAh/g (about 160 Wh/kg). As a negative electrode active material for a next-generation type non-aqueous electrolyte secondary battery, silicon (Si) having a theoretical capacity of 4200 mAh/g corresponding to about 10 times or more of the theoretical capacity of graphite has been given many attentions. Besides silicon, use of various non-carbonaceous materials showing high theoretical capacity by forming an alloy with lithium as a novel material substituting for carbonaceous active materials, such as graphite, has been suggested.

However, silicon-based materials cause cracking inside of and on the surface of an electrode and detachment of electrode active materials due to a high volumetric swelling ratio during a process for forming an alloy with lithium, resulting in degradation of electrical contact and rapid deterioration of the cycle capacity of a secondary battery.

To solve the above-mentioned problems of silicon-based materials, active attempts have been made to apply a hybrid type negative electrode including a mixture of a non-carbonaceous active material, such as a silicon-based material, with a carbonaceous active material. However, when mixing a silicon-based negative electrode active material with a carbonaceous graphite active material, energy density may be improved but the performance of a secondary battery is degraded undesirably.

Therefore, there is still a need for developing a secondary battery having improved energy density as well as solving the above-mentioned problems of silicon-based materials.

Disclosure

Technical Problem

The present disclosure is designed to solve the problems of the related art, and therefore the present disclosure is directed to providing a secondary battery having improved cycle characteristics and a method for operating the same.

Technical Solution

In one aspect of the present disclosure, there is provided a secondary battery according to any one of the following embodiments.

According to the first embodiment, there is provided a secondary battery including a positive electrode, a negative electrode and a separator interposed between the negative electrode and the positive electrode, wherein the negative electrode includes: a negative electrode current collector; and a negative electrode active material layer on at least one surface of the negative electrode current collector, the negative electrode active material layer includes a mixed active material comprising a carbonaceous active material and a Si-based active material, and the secondary battery is controlled by setting a lower limit of state-of-charge (SOC) during operation of the secondary battery depending on the weight mixing ratio of the Si-based active material to the carbonaceous active material and the capacity ratio of the Si-based active material to the carbonaceous active material.

According to the second embodiment, there is provided the secondary battery as defined in the first embodiment, which is controlled by calculating the capacity of the Si-based active material based on the total capacity of the mixed active material including the Si-based active material and the carbonaceous active material from the weight mixing ratio of the Si-based active material to the carbonaceous active material and the capacity ratio of the Si-based active material to the carbonaceous active material, setting the lower limit of SOC during the operation of the secondary battery based on the calculated capacity of the Si-based active material, and discharging the secondary battery to a voltage corresponding to the capacity of the lower limit of SOC.

According to the third embodiment, there is provided the secondary battery as defined in the first or the second embodiment, wherein when the weight mixing ratio of the Si-based active material to the carbonaceous active material is $x:100-x$, and the capacity ratio of the Si-based active material to the carbonaceous active material is $a:1$, percentage (%) of the capacity of the Si-based active material based on the total capacity of the Si-based active material and the carbonaceous active material is calculated according to the following Formula 1, the lower limit of SOC during the operation of the secondary battery is set based on the calculated percentage (%) of the capacity of the Si-based active material, and the secondary battery is discharged merely to a voltage corresponding to the capacity of the lower limit of SOC:

$$\text{percentage of capacity of Si-based active material based on total capacity of Si-based active material and carbonaceous active material} = [ax/[ax+(100-x)]] \times 100 = 100ax/[(a-1)x+100](\%). \quad [\text{Formula 1}]$$

According to the fourth embodiment, there is provided the secondary battery as defined in any one of the first to the third embodiments, wherein when the weight mixing ratio of the Si-based active material to the carbonaceous active material is $x:100-x$, and the capacity ratio of the Si-based active material to the carbonaceous active material is $a:1$, percentage (%) of the capacity of the Si-based active material based on the total capacity of the Si-based active material and the carbonaceous active material is calculated according to the following Formula 1, and when the calculated percentage (%) of the capacity of the Si-based active material is C (%), the lower limit of SOC during the operation of the secondary battery is determined within a range from C−1 to C+1:

Percentage (%) of capacity of Si-based active material based on total capacity of Si-based active material and carbonaceous active material=[$ax/[ax+(100-x)]$]×100=100$ax/[(a-1)x+100]$(%). [Formula 1]

According to the fifth embodiment, there is provided the secondary battery as defined in any one of the first to the fourth embodiments, wherein the Si-based active material includes Si, $SiO_x$ wherein 0<x<2, SiC, Si-based alloy, or two or more of them.

According to the sixth embodiment, there is provided the secondary battery as defined in any one of the first to the fifth embodiments, wherein the carbonaceous active material includes natural graphite, artificial graphite, soft carbon, hard carbon, pitch carbide, baked cokes, graphene, carbon nanotubes, or two or more of them.

According to the seventh embodiment, there is provided the secondary battery as defined in any one of the first to the sixth embodiments,
wherein when the Si-based active material is Si, the carbonaceous active material is artificial graphite, the weight mixing ratio of the Si to artificial graphite is 2:98, and the capacity ratio of the Si to artificial graphite is 8.9:1,
the ratio of Si capacity based on the total capacity of the negative electrode active material including Si and artificial graphite is calculated according to the above Formula 1, the lower limit of SOC during the operation of the secondary battery is set based on the calculated value, and the secondary battery is discharged merely to a voltage corresponding to the capacity of the capacity of the lower limit of SOC.

According to the eighth embodiment, there is provided the secondary battery as defined in any one of the first to the seventh embodiments, wherein when the calculated value is C (%), the lower limit of SOC during the operation of the secondary battery is within a range from C−1 to C+1.

According to the ninth embodiment, there is provided a method for operating a secondary battery including controlling the second battery by setting a lower limit of state-of-charge (SOC) during operation of the secondary battery, wherein the second battery includes a positive electrode, a negative electrode and a separator interposed between the negative electrode and the positive electrode, wherein the negative electrode includes: a negative electrode current collector; and a negative electrode active material layer on at least one surface of the negative electrode current collector, and the negative electrode active material layer includes a carbonaceous active material and a Si-based active material,
wherein setting a lower limit of state-of-charge (SOC) during the operation of the secondary battery depends on the weight mixing ratio of the Si-based active material to the carbonaceous active material and the capacity ratio of the Si-based active material to the carbonaceous active material.

According to the tenth embodiment of the present disclosure, there is provided the method for operating a secondary battery as defined in the ninth embodiment, which includes: calculating the capacity of the Si-based active material based on the total capacity of the mixed active material including the Si-based active material and the carbonaceous active material from the weight mixing ratio of the Si-based active material to the carbonaceous active material and the capacity ratio of the Si-based active material to the carbonaceous active material; setting the lower limit of SOC during the operation of the secondary battery based on the calculated capacity of the Si-based active material; and discharging the secondary battery merely to a voltage corresponding to the capacity of the lower limit of SOC.

According to the eleventh embodiment, there is provided the method for operating a secondary battery as defined in the ninth or the tenth embodiment,
wherein when the weight mixing ratio of the Si-based active material to the carbonaceous active material is x:100−x, and the capacity ratio of the Si-based active material to the carbonaceous active material is a:1,
percentage (%) of the capacity of the Si-based active material based on the total capacity of the Si-based active material and the carbonaceous active material is calculated according to the following Formula 1,
the lower limit of SOC during the operation of the secondary battery is set based on the calculated percentage (%) of the capacity of the Si-based active material, and
the secondary battery is discharged merely to a voltage corresponding to the capacity of the lower limit of SOC:

Percentage (%) of capacity of Si-based active material based on total capacity of Si-based active material and carbonaceous active material=[$ax/[ax+(100-x)]$]×100=100$ax/[(a-1)x+100]$(%). [Formula 1]

According to the twelfth embodiment, there is provided the method for operating a secondary battery as defined in any one of the ninth to the eleventh embodiments,
wherein when the weight mixing ratio of the Si-based active material to the carbonaceous active material is x:100−x, and the capacity ratio of the Si-based active material to the carbonaceous active material is a:1,
percentage (%) of the capacity of the Si-based active material based on the total capacity of the Si-based active material and the carbonaceous active material is calculated according to the following Formula 1, and
when the calculated percentage (%) of the capacity of the Si-based active material is taken as C (%), the lower limit of SOC during the operation of the secondary battery is determined within a range from C−1 to C+1:

Percentage (%) of capacity of Si-based active material based on total capacity of Si-based active material and carbonaceous active material=[$ax/[ax+(100-x)]$]×100=100$ax/[(a-1)x+100]$(%). [Formula 1]

Advantageous Effects

According to an embodiment of the present disclosure, it is possible to provide a secondary battery having significantly improved cycle characteristics by using a Si-based (silicon-based) active material and a carbonaceous active material at the same time as negative electrode active materials, while limiting a range of use by setting the lower limit of SOC during the operation of the secondary battery depending on the weight mixing ratio of the active materials and the capacity ratio thereof, and setting the voltage corresponding to the capacity of the lower limit of SOC as a lower limit of voltage during charge/discharge cycles. It is also possible to provide a method for operating the secondary battery.

DESCRIPTION OF DRAWINGS

The FIGURE is a graph illustrating the results of evaluation of capacity retention depending on cycle number of the secondary batteries according to Example 1 and Comparative Examples 1-3.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a secondary battery including a positive electrode, a negative electrode and a separator interposed between the negative electrode and the positive electrode, wherein the negative electrode includes: a negative electrode current collector; and a negative electrode active material layer formed on at least one surface of the negative electrode current collector, the negative electrode active material layer includes a carbonaceous active material and a Si-based active material, and the secondary battery is operated by setting a lower limit of state-of-charge (SOC) during the operation of the secondary battery depending on the weight mixing ratio of the Si-based active material to the carbonaceous active material and the capacity ratio of the Si-based active material to the carbonaceous active material.

According to the present disclosure, when a Si-based negative electrode active material, such as pure Si, SiO, SiC, Si alloy, or the like, is mixed with a carbonaceous active material and the mixture is used as a negative electrode active material for a negative electrode of a secondary battery, the range of use of the secondary battery is limited in order to improve the performance of the secondary battery.

In other words, when using a Si-based negative electrode active material for a negative electrode in combination with a carbonaceous active material, energy density can be improved through the combined use of the Si-based negative electrode active material having a significantly higher capacity as compared to the carbonaceous active material. However, in this case, there is a problem in that the performance of the secondary battery may be deteriorated, since an electrical short-circuit may occur due to natural degeneration and volumetric swelling of the Si-based active material and a contact failure with the surroundings.

Therefore, when the range of use of the secondary battery is limited according to the content of the Si-based negative electrode active material mixed with the carbonaceous active material, use of the Si-based active material is limited so that degeneration of the Si-based active material may be prevented, and thus the secondary battery may be provided with increased energy density, while maintaining the performance of the secondary battery.

The expression 'the range of use of the secondary battery is limited according to the content of the Si-based negative electrode active material mixed with the carbonaceous active material' means that the capacity of the Si-based active material is calculated based on the total capacity of the mixed active material including the Si-based active material and the carbonaceous active material from the weight mixing ratio of the Si-based active material to the carbonaceous active material and the capacity ratio of the Si-based active material to the carbonaceous active material, the lower limit of SOC during the operation of the secondary battery is set based on the calculated capacity of the Si-based active material, and the secondary battery is discharged merely to a voltage corresponding to the capacity of the lower limit of SOC.

According to an embodiment of the present disclosure, when the weight mixing ratio of the Si-based active material to the carbonaceous active material is x:100−x, and the capacity ratio of the Si-based active material to the carbonaceous active material is a:1, the secondary battery may be subjected to cycles in a range of SOC from 100% to $100ax/[(a-1)x+100]$ (%).

In other words, when the weight mixing ratio of the Si-based active material to the carbonaceous active material is x:100−x, and the capacity ratio of the Si-based active material to the carbonaceous active material is a:1, the capacity of the Si-based active material and that of the carbonaceous active material are ax and (100−x), respectively, and the percentage of the capacity of the Si-based active material based on the total capacity corresponding to the sum of the capacity of the Si-based active material and the capacity of the carbonaceous active material may be calculated according to the following Formula 1:

Percentage (%) of capacity of Si-based active material based on total capacity of Si-based active material and carbonaceous active material=$[ax/[ax+(100-x)]] \times 100 = 100ax/[(a-1)x+100]$ (%)   Formula 1

When the weight mixing ratio of the Si-based active material to the carbonaceous active material is x:100−x, and the capacity ratio of the Si-based active material to the carbonaceous active material is a:1, the lower limit of SOC during the operation of the secondary battery is set on the basis of $100ax/[(a-1)x+100]$ (%), which is the percentage (%) of the capacity of the Si-based active material based on the total capacity of the Si-based active material and the carbonaceous active material, from SOC 100%, and the secondary battery may be discharged merely to a voltage corresponding to the capacity of the lower limit of SOC.

According to an embodiment of the present disclosure, when the calculated value of percentage (%) of the capacity of the Si-based active material, i.e. $100ax/[(a-1)x+100]$ (%) is taken as C (%), the lower limit of SOC during the operation of the secondary battery may be determined in a range from C−1 to C+1, or in a range from C−0.5 to C+0.5. The reason why the lower limit of SOC during the operation of the secondary battery is determined in a range from C−1 to C+1 is that application of the value 'a' (capacity ratio) to the calculation of C (%) may have a deviation, even if it is small, and operation of the secondary battery with a lower limit of SOC set within a range from C−1 to C+1, or in a range from C−0.5 to C+0.5 can realize the substantially same level of capacity retention.

For example, when Si is used as a Si-based active material and artificial graphite is used as a carbonaceous active material, and Si is mixed with artificial graphite at a weight ratio of 2% (i.e. weight ratio of Si to artificial graphite is 2:98), the capacity ratio of Si based on the total negative electrode may be about 15.37%[=$(2 \times 8.9 \times 100)/(7.9 \times 2+100)$], since the capacity of Si is about 8.9 times higher than the capacity of artificial graphite.

Therefore, the secondary battery including a negative electrode manufactured by using a negative electrode active material prepared by mixing Si with artificial graphite at a weight ratio of 2% (i.e. weight ratio of Si to artificial graphite is 2:98) may provide improved life, when the lower limit of SOC during charge/discharge is set based on 15.37% corresponding to the ratio of Si capacity to the total capacity of the negative electrode active material during the operation of the secondary battery, and the secondary battery is discharged merely to a voltage corresponding to the capacity of the lower limit of SOC.

According to an embodiment of the present disclosure, the secondary battery including a negative electrode manufactured by using a negative electrode active material prepared by mixing Si with artificial graphite at a weight ratio of 2% (i.e. weight ratio of Si to artificial graphite is 2:98) may provide improved life, when the lower limit of SOC during the operation of the secondary battery is set to 15% corresponding to a range from −1 to +1 (14.37-16.37%), or a range from −0.5 to 0.5 (14.87-15.87%), on the basis of 15.37% corresponding to the ratio of Si capacity to the total capacity of the negative electrode active material during the operation of the secondary battery, and the secondary battery is discharged merely to a voltage corresponding to the capacity of the lower limit of SOC.

According to an embodiment of the present disclosure, when Si is mixed at a weight ratio of 3% (i.e. weight ratio of Si to artificial graphite is 3:97), the capacity ratio of Si based on the total negative electrode may be about 23.05% [=(3×8.9×100)/(7.9×2+100)]. Then, the secondary battery including a negative electrode manufactured by using the negative electrode active material may provide improved life, when the lower limit of SOC during the operation of the secondary battery is set to 23% corresponding to a range from −1 to +1 (22.05-24.05%), or a range from −0.5 to 0.5 (22.55-23.55%), on the basis of 23.05% which is the capacity ratio of Si based on the total negative electrode, and the secondary battery is discharged merely to a voltage corresponding to the capacity of the lower limit of SOC.

The current collector may include a material selected from: stainless steel, aluminum, nickel, titanium, baked carbon, copper; stainless steel surface-treated with carbon, nickel, titanium or silver; aluminum-cadmium alloys; non-conductive polymers surface-treated with conductive materials; non-conductive polymers surface-treated with metals; and conductive polymers.

In addition, the current collector may have a thickness of 3-500 μm, but is not limited thereto. Further, the size of the porous current collector is not particularly limited and may be selected suitably depending on the particular use of the electrode.

The carbonaceous active material is not particularly limited, as long as it is a carbonaceous active material capable of lithium intercalation/deintercalation during charge/discharge of a battery.

The carbonaceous active material may be amorphous carbon, crystalline carbon, or a mixture of an amorphous phase with a crystalline phase. Particularly, the carbonaceous active material may include natural graphite, artificial graphite, soft carbon, hard carbon, pitch carbide, baked cokes, graphene, carbon nanotubes, or a mixture of two or more of them. Particularly, graphite is a negative electrode material used in the conventional secondary batteries, and has advantages in that it can realize its capacity stably even when being used with silicon to manufacture an electrode, it shows excellent initial efficiency, and it can compensate for the low initial efficiency of a silicon-based negative electrode material. Therefore, graphite can contribute to improvement of the initial efficiency of an electrode, and thus a graphite-based material, such as artificial graphite or natural graphite, may be used preferably.

The Si-based active material includes Si, and is not particularly limited, as long as it can form an alloy with lithium. Particularly, the Si-based negative electrode active material may include Si, $SiO_x$ (0<x<2), SiC, Si-based alloy, or two or more of them.

According to an embodiment of the present disclosure, the negative electrode may be obtained by applying a mixture of a negative electrode active material including the above-described carbonaceous negative electrode active material and a non-carbonaceous negative electrode active material, a conductive material and a binder onto a negative electrode current collector, followed by drying. If necessary, the mixture may further include a filler.

According to an embodiment of the present disclosure, the current collector is formed to have a thickness of 3-500 μm. The current collector is not particularly limited, as long as it causes no chemical change in the corresponding battery and has high conductivity. Particular examples of the current collector may include stainless steel, aluminum, nickel, titanium, baked carbon, aluminum or stainless steel surface-treated with carbon, nickel, titanium or silver, or the like. A current collector may be selected suitably depending on the polarity of a positive electrode or negative electrode.

The binder is an ingredient which assists binding between the electrode active material and the conductive material and binding to the current collector. In general, the binder is added in an amount of 1-50 wt % based on the total weight of the electrode mixture. The binder may include high-molecular weight polyacrylonitrile-acrylic acid copolymers, but is not limited thereto. In addition to this, particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber (SBR), polyacrylic acid, polyacrylic acid substituted with an alkali cation or ammonium ion, poly(alkylene-co-maleic anhydride) substituted with an alkali cation or ammonium ion, poly(alkylene-co-maleic acid) substituted with an alkali cation or ammonium ion, polyethylene oxide, fluororubber, or two or more of them. More particularly, the polyacrylic acid substituted with an alkali cation or ammonium ion may be exemplified by lithium-polyacrylic acid (Li-PAA, lithium-substituted polyacrylic acid), and the poly(alkylene-co-maleic anhydride) substituted with an alkali cation or ammonium ion may be exemplified by lithium-substituted polyisobutylene-co-maleic anhydride.

The conductive material is an ingredient causing no chemical change in the corresponding battery. Particular examples of the conductive material include: graphite, such as natural graphite or artificial graphite; carbon black, such as carbon black, acetylene black, Ketjen black (trade name), carbon nanotubes, carbon nanofibers, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; and conductive materials, such as polyphenylene derivatives.

According to an embodiment of the present disclosure, when manufacturing a negative electrode by applying a mixture including a negative electrode active material containing the carbonaceous negative electrode active material and non-carbonaceous negative electrode active material, the conductive material and the binder onto a negative electrode current collector, the negative electrode may be obtained through a dry process by directly applying a solid mixture including the negative electrode active material, the conductive material and the binder. Otherwise, the negative electrode may be obtained through a wet process by adding the negative electrode active material, the conductive material and the binder to a dispersion medium, followed by agitation, applying the resultant mixture in the form of slurry, and removing the dispersion medium through drying, or the like. Herein, particular examples of the dispersion medium used for a wet process may include an aqueous medium, such as water (deionized water, or the like), or an organic medium, such as N-methyl-2-pyrrolidone (NMP) or acetone.

In another aspect, there is provided a secondary battery including a negative electrode, a positive electrode, and a separator interposed between the positive electrode and the negative electrode, wherein the negative electrode includes: a negative electrode current collector; and a negative electrode active material layer formed on at least one surface of the negative electrode current collector, and the negative electrode active material layer includes a carbonaceous active material and a Si-based active material.

The positive electrode may be obtained by applying and drying a mixture of a positive electrode active material, a conductive material and a binder on a positive electrode current collector. If necessary, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; $Fe_2(MoO_4)_3$; or the like.

Reference will be made to the above description of the negative electrode about the conductive material, the current collector and the binder used for the positive electrode.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include films, sheets or non-woven webs made of olefinic polymers, such as polypropylene having chemical resistance and hydrophobicity; glass fibers or polyethylene; or the like. Meanwhile, the separator may further include a porous layer containing a mixture of inorganic particles with a binder resin, on the outermost surface thereof.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), vinylene carbonate (VC), gamma-butyrolactone (GBL), flouroethylene carbonate (FEC), methyl formate, ethyl formate, propyl formate, methyl acetate, ethyl acetate, propyl acetate, pentyl acetate, methyl propionate, ethyl propionate, butyl propionate, or a mixture thereof. In addition, halogen derivatives of the organic solvents and linear ester compounds may also be used. The lithium salt is an ingredient easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylate, lithium tetraphenylborate, imides, or the like.

Finally, the separator is interposed between the negative electrode and the positive electrode to form an electrode assembly, the electrode assembly is received in a battery casing, and then an electrolyte is injected thereto to provide a secondary battery.

The electrolyte includes a lithium salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonates is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The secondary battery according to an embodiment of the present disclosure is not limited in terms of its outer shape or casing, and may be provided as a cylindrical battery using a can, a prismatic battery, a pouch-type battery or a coin-type battery. According to an embodiment of the present disclosure, the secondary battery may be a pouch-type secondary battery.

In addition, the secondary battery according to an embodiment of the present disclosure may be a lithium secondary battery, particular examples of which include any conventional secondary batteries, such as lithium metal secondary batteries, lithium ion secondary batteries, lithium polymer secondary batteries or lithium ion polymer secondary batteries.

According to an embodiment of the present disclosure, the lithium secondary battery may be a stacked, wound, stacked and folded or cable type battery, may be used for a battery cell used as a power source for a compact device, and may be used as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

In still another aspect of the present disclosure, there is provided a method for operating a secondary battery including a positive electrode, a negative electrode and a separator interposed between the negative electrode and the positive electrode, wherein the negative electrode includes: a negative electrode current collector; and a negative electrode active material layer formed on at least one surface of the negative electrode current collector, and the negative electrode active material layer includes a carbonaceous active material and a Si-based active material, the method being characterized in that the secondary battery is operated by setting a lower limit of state-of-charge (SOC) during the operation of the secondary battery depending on the weight mixing ratio of the Si-based active material to the carbonaceous active material and the capacity ratio of the Si-based active material to the carbonaceous active material.

As described above, according to an embodiment of the present disclosure, the capacity of the Si-based active material based on the total capacity of the mixed active material including the Si-based active material and the carbonaceous active material is calculated from the weight mixing ratio of the Si-based active material to the carbonaceous active material and the capacity ratio of the Si-based active material to the carbonaceous active material, the lower limit of SOC during the operation of the secondary battery is set based on the calculated capacity of the Si-based active material, and the secondary battery may be discharged merely to a voltage corresponding to the capacity of the lower limit of SOC.

In addition, when the weight mixing ratio of the Si-based active material to the carbonaceous active material is x:100−x, and the capacity ratio of the Si-based active material to the carbonaceous active material is a:1, percentage (%) of the capacity of the Si-based active material based on the total capacity of the Si-based active material and the carbonaceous active material is calculated according to the following Formula 1, the lower limit of SOC during the operation of the secondary battery is set based on the calculated percentage (%) of the capacity of the Si-based active material, and the secondary battery is discharged merely to a voltage corresponding to the capacity of the lower limit of SOC:

Percentage (%) of capacity of Si-based active material based on total capacity of Si-based active material and carbonaceous active material=$[ax/[ax+(100-x)]] \times 100 = 100ax/[(a-1)x+100]$ (%)     Formula 1

Further, when the weight mixing ratio of the Si-based active material to the carbonaceous active material is x:100−x, and the capacity ratio of the Si-based active material to the carbonaceous active material is a:1, percentage (%) of the capacity of the Si-based active material based on the total capacity of the Si-based active material and the carbonaceous active material is calculated according to the above Formula 1, and when the calculated percentage (%) of the capacity of the Si-based active material is taken as C (%), the lower limit of SOC during the operation of the secondary battery is determined within a range from C−1 to C+1, or a range from C−0.5 to C+0.5.

As described above, the reason why the lower limit of SOC during the operation of the secondary battery is determined in a range from C−1 to C+1 is that application of the value 'a' (capacity ratio) to the calculation of C (%) may have a deviation, even if it is small, and operation of the secondary battery with a lower limit of SOC set within a range from C−1 to C+1, or in a range from C−0.5 to C+0.5 can realize the substantially same level of capacity retention.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Manufacture of Negative Electrode

First, a mixed negative electrode active material containing artificial graphite as a carbonaceous active material and Si as a Si-based active material, a binder polymer (styrene-butadiene rubber (SBR) and carboxymethyl cellulose (CMC)) and carbon black as a conductive material were mixed at a weight ratio of 95:3.5:1.5, and the resultant mixture was mixed with water as a dispersion medium at a weight ratio of 1:2 to prepare slurry for an active material layer. Herein, the weight of Si was 2 wt % based on the total weight of the mixed negative electrode active material containing artificial graphite and Si, and the weight ratio of styrene-butadiene rubber (SBR) to carboxymethyl cellulose (CMC) was 2.3:1.2.

The slurry for an active material layer was coated on one surface of copper (Cu) film having a thickness of 10 μm as a negative electrode current collector by using a slot die and dried under vacuum at 130° C. for 1 hour to form an active material layer on the copper film.

The resultant active material layer was pressed by a roll pressing process to obtain a negative electrode including an active material layer having a thickness of 80 μm and a single layer structure. The loading amount was 17 mg/cm² based on the dry weight of the negative electrode active material layer.

Manufacture of Positive Electrode

First, Li(Ni$_{0.8}$Mn$_{0.1}$Co$_{0.1}$)O$_2$ (NCM-811) as a positive electrode active material, carbon black as a conductive material and polyvinylidene fluoride (PVdF) as a binder were added to N-methyl pyrrolidone (NMP) as a solvent at a weight ratio of 96:2:2 to prepare positive electrode active material slurry. The slurry was coated on an aluminum current collector having a thickness of 15 μm, and then drying and pressing were carried out under the same conditions as the negative electrode to obtain a positive electrode. The loading amount was 20 mg/cm² based on the dry weight of the positive electrode active material layer.

Manufacture of Lithium Secondary Battery

LiPF$_6$ was dissolved in a mixed organic solvent containing ethylene carbonate (EC), propylene carbonate (PC) and ethylmethyl carbonate (EMC) at a volume ratio of 3:1:6 to a concentration of 1.0 M to prepare a non-aqueous electrolyte.

A polyolefin separator was interposed between the positive electrode and the negative electrode obtained as described above, and the electrolyte was injected thereto to obtain a lithium secondary battery.

Operation of Lithium Secondary Battery

The lithium secondary battery was subjected to the first charge and discharge cycle at room temperature (25° C.) at an electric current of C/3, wherein the operating voltage was 4.2-2.5 V based on SOC from 100% to 0%.

Then, percentage of the capacity Si based on the total capacity of the negative electrode active material during charge/discharge was calculated, the calculated value was defined as a lower limit of SOC, and the secondary battery was discharged merely to the lower limit voltage corresponding to the capacity of the lower limit of SOC and charged to 4.2 V in the same manner.

In Example 1, since Si was used in an amount of 2 wt % based on the total weight of the mixed negative electrode active material containing artificial graphite and Si, the ratio of the capacity of Si was 15.37%, considering the capacity of Si corresponding to 8.9 times of the capacity of artificial graphite. Herein, the lower limit of SOC was limited to 15% corresponding to a range from 15.37-1% to 15.37+1%, the secondary battery was discharged merely to the lower limit of voltage corresponding to the capacity of the lower limit of SOC, 15%, and charged to a voltage of 4.2 V corresponding to a capacity of 100% of the upper limit of SOC. The above-defined charge/discharge cycle was repeated for 300 cycles. The FIGURE illustrates a change in capacity retention for 300 charge/discharge cycles.

Comparative Example 1

A lithium secondary battery was obtained in the same manner as Example 1, except that the lower limit of SOC was set optionally to 0%, and the secondary battery was subjected to 300 charge/discharge cycles by discharging it merely to the lower limit of voltage (2.5 V) corresponding to a capacity of 0%, and charging it to a voltage of 4.2 V corresponding to a capacity of 100% of the upper limit of SOC. The FIGURE illustrates a change in capacity retention for 300 charge/discharge cycles.

Comparative Example 2

A lithium secondary battery was obtained in the same manner as Example 1, except that the lower limit of SOC was set optionally to 5%, and the secondary battery was subjected to 300 charge/discharge cycles by discharging it merely to the lower limit of voltage corresponding to a capacity of 5%, and charging it to a voltage of 4.2 V corresponding to a capacity of 100% of the upper limit of SOC. The FIGURE illustrates a change in capacity retention for 300 charge/discharge cycles.

Comparative Example 3

A lithium secondary battery was obtained in the same manner as Example 1, except that the lower limit of SOC was set optionally to 10%, and the secondary battery was subjected to 300 charge/discharge cycles by discharging it merely to the lower limit of voltage corresponding to a capacity of 10%, and charging it to a voltage of 4.2 V corresponding to a capacity of 100% of the upper limit of SOC. The FIGURE illustrates a change in capacity retention for 300 charge/discharge cycles.

Referring to the FIGURE, in the case of Example 1, the lower limit of SOC during the operation of the secondary battery was calculated depending on the weight mixing ratio of the Si-based active material to the carbonaceous active material and the capacity ratio of the Si-based active material to the carbonaceous active material, and the secondary battery was discharged merely to a voltage corresponding to the capacity of SOC within a range from the lower limit of SOC−1 to the lower limit of SOC+1, and charged to the voltage corresponding to a capacity of the upper limit of SOC 100%. As a result, it can be seen that the secondary battery according to Example 1 shows excellent cycle life characteristics of about 93% or more even after 300 cycles.

While the lower limit of SOC was set depending on the weight mixing ratio of the Si-based active material to the carbonaceous active material and the capacity ratio of the Si-based active material to the carbonaceous active material according to Example 1, each of the secondary batteries according to Comparative Examples 1-3 was operated by optionally setting the lower limit of SOC to 0%, 5% or 10%, and discharging the secondary battery to a voltage corresponding to the capacity of each SOC value. As a result, it can be seen that the secondary batteries according to Comparative Examples 1-3 show significantly low cycle life characteristics approximately in the 70-80% range after 300 cycles.

What is claimed is:

1. A secondary battery, comprising:
    a positive electrode,
    a negative electrode, and
    a separator interposed between the negative electrode and the positive electrode,
    wherein the negative electrode comprises: a negative electrode current collector; and a negative electrode active material layer on at least one surface of the negative electrode current collector,
    wherein the negative electrode active material layer comprises a mixed active material comprising a carbonaceous active material and a Si-based active material, and
    wherein the secondary battery is configured to be controlled by setting a lower limit of state-of-charge (SOC) during operation of the secondary battery depending on a weight mixing ratio of the Si-based active material to the carbonaceous active material and a capacity ratio of the Si-based active material to the carbonaceous active material.

2. The secondary battery according to claim 1, which is controlled by calculating a capacity of the Si-based active material based on a total capacity of the mixed active material comprising the Si-based active material and the carbonaceous active material from the weight mixing ratio of the Si-based active material to the carbonaceous active material and the capacity ratio of the Si-based active material to the carbonaceous active material,
    setting the lower limit of SOC during the operation of the secondary battery based on the calculated capacity of the Si-based active material, and
    discharging the secondary battery to a voltage corresponding to the capacity of the lower limit of SOC.

3. The secondary battery according to claim 2, wherein when the weight mixing ratio of the Si-based active material to the carbonaceous active material is x:100−x, where x is in a range of 2 to less than 100, and the capacity ratio of the Si-based active material to the carbonaceous active material is a:1, where a is in a range of 8.9 to 100, a percentage of the capacity of the Si-based active material based on the total capacity of the Si-based active material and the carbonaceous active material is calculated according to the following Formula 1, wherein the lower limit of SOC during the operation of the secondary battery is set based on the calculated percentage of the capacity of the Si-based active material, wherein the secondary battery is discharged to a voltage corresponding to the capacity of the lower limit of SOC:

percentage of capacity of Si-based active material based on total capacity of Si-based active material and carbonaceous active material=$100ax/[(a-1)x+100]$(%), and  [Formula 1]

with the proviso that SOC is in a range of 100% to $100ax/[(a-1)x+100]$(%).

4. The secondary battery according to claim 2, wherein when the weight mixing ratio of the Si-based active material to the carbonaceous active material is x:100−x, where x is in a range of 2 to less than 100, and the capacity ratio of the Si-based active material to the carbonaceous active material is a:1, where a is in a range of 8.9 to 100, a percentage of the capacity of the Si-based active material based on the total capacity of the Si-based active material and the carbonaceous active material is calculated according to the following Formula 1, when the calculated percentage of the capacity of the Si-based active material is C, where C is in a range of 15.37% to less than 100%, the lower limit of SOC during the operation of the secondary battery is within a range from C−1 to C+1:

percentage of capacity of Si-based active material based on total capacity of Si-based active material and carbonaceous active material=$100ax/[(a-1)x+100]$(%), and  [Formula 1]

with the proviso that SOC is in a range of 100% to $100ax/[(a-1)x+100]$(%).

5. The secondary battery according to claim 1, wherein the Si-based active material comprises at least one of Si, $SiO_x$ wherein 0<x<2, SiC, and Si-based alloy.

6. The secondary battery according to claim 1, wherein the carbonaceous active material comprises at least one of natural graphite, artificial graphite, soft carbon, hard carbon, pitch carbide, baked cokes, graphene, and carbon nanotubes.

7. The secondary battery according to claim 3, wherein when the Si-based active material is Si, the carbonaceous active material is artificial graphite, the weight mixing ratio of the Si to artificial graphite is 2:98, and the capacity ratio of the Si to artificial graphite is 8.9:1, wherein the ratio of Si capacity based on the total capacity of the negative electrode active material comprising Si and artificial graphite is calculated according to Formula 1, the lower limit of SOC during the operation of the secondary battery is set based on the calculated value, and the secondary battery is discharged to a voltage corresponding to the capacity of the lower limit of SOC.

8. The secondary battery according to claim 4, wherein the lower limit of SOC during the operation of the secondary battery is within a range from C−0.5 to C+0.5.

9. A method for operating a secondary battery, comprising:

controlling the second battery by setting a lower limit of state-of-charge (SOC) during operation of the secondary battery, wherein the second battery comprises a positive electrode, a negative electrode, and a separator interposed between the negative electrode and the positive electrode, wherein the negative electrode comprises: a negative electrode current collector; and a negative electrode active material layer on at least one surface of the negative electrode current collector, and wherein the negative electrode active material layer comprises a carbonaceous active material and a Si-based active material, wherein setting the lower limit of state-of-charge (SOC) during the operation of the secondary battery depends on a weight mixing ratio of the Si-based active material to the carbonaceous active material and a capacity ratio of the Si-based active material to the carbonaceous active material.

10. The method for operating the secondary battery according to claim 9, which comprises:

calculating the capacity of the Si-based active material based on a total capacity of the mixed active material comprising the Si-based active material and the carbonaceous active material from the weight mixing ratio of the Si-based active material to the carbonaceous active material and the capacity ratio of the Si-based active material to the carbonaceous active material;

setting the lower limit of SOC during the operation of the secondary battery based on the calculated capacity of the Si-based active material; and discharging the secondary battery to a voltage corresponding to the capacity of the lower limit of SOC.

11. The method for operating the secondary battery according to claim 10, wherein when the weight mixing ratio of the Si-based active material to the carbonaceous active material is x:100−x, where x is in a range of 2 to less than 100, and the capacity ratio of the Si-based active material to the carbonaceous active material is a:1, where a is in a range of 8.9 to 100, percentage (%) of the capacity of the Si-based active material based on the total capacity of the Si-based active material and the carbonaceous active material is calculated according to the following Formula 1, the lower limit of SOC during the operation of the secondary battery is set based on the calculated percentage (%) of the capacity of the Si-based active material, the secondary battery is discharged merely to a voltage corresponding to the capacity of the lower limit of SOC:

percentage of capacity of Si-based active material based on total capacity of Si-based active material and carbonaceous active material=$100ax/[(a-1)x+100]$(%), and  [Formula 1]

with the proviso that SOC is in a range of 100% to $100ax/[(a-1)x+100]$(%).

12. The method for operating the secondary battery according to claim 10, wherein when the weight mixing ratio of the Si-based active material to the carbonaceous active material is x:100−x, where x is in a range of 2 to less than 100, and the capacity ratio of the Si-based active material to the carbonaceous active material is a:1, where a is in a range of 8.9 to 100, percentage of the capacity of the Si-based active material based on the total capacity of the Si-based active material and the carbonaceous active material is calculated according to Formula 1, when the calculated percentage of the capacity of the Si-based active material is C, where C is in a range of 15.37% to less than 100%, the lower limit of SOC during the operation of the secondary battery is within a range from C−1 to C+1:

percentage of capacity of Si-based active material based on total capacity of Si-based active material and carbonaceous active material=$100ax/[(a-1)x+100]$(%), and  [Formula 1]

with the proviso that SOC is in a range of 100% to $100ax/[(a-1)x+10]$(%).

\* \* \* \* \*